April 23, 1940.   E. M. THIELERS ET AL   2,198,351
HYDROMETER AND ARRANGEMENT FOR REMOTE CONTROL OF LIQUIDS
Filed Nov. 5, 1936   7 Sheets-Sheet 1
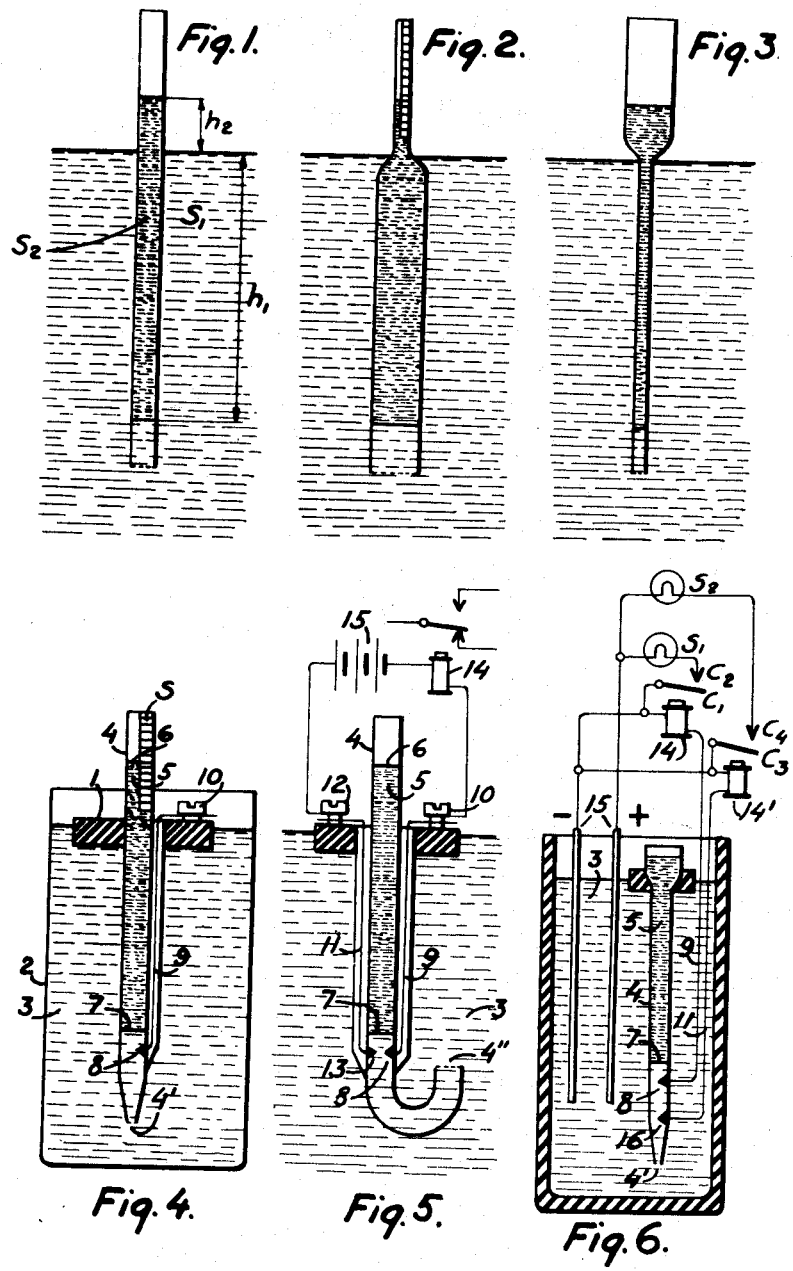
Ernst Martin Thielers
Sten Daniel Vigren
Sven Harald Kafsten
INVENTORS
their ATT'Y.

April 23, 1940.　　　E. M. THIELERS ET AL　　　2,198,351
HYDROMETER AND ARRANGEMENT FOR REMOTE CONTROL OF LIQUIDS
Filed Nov. 5, 1936　　　7 Sheets-Sheet 2

Ernst Martin Thielers
Sten Daniel Vigren
Sven Harald Käfsten
INVENTORS their ATTY.

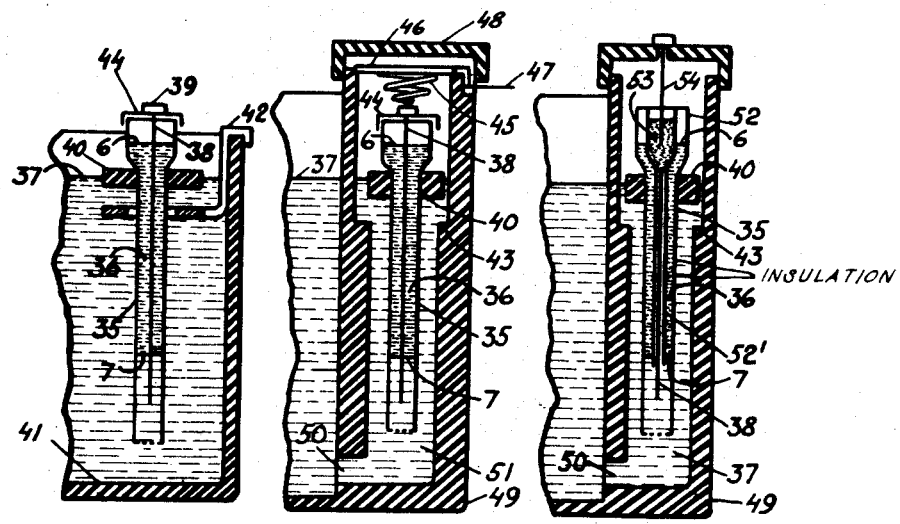
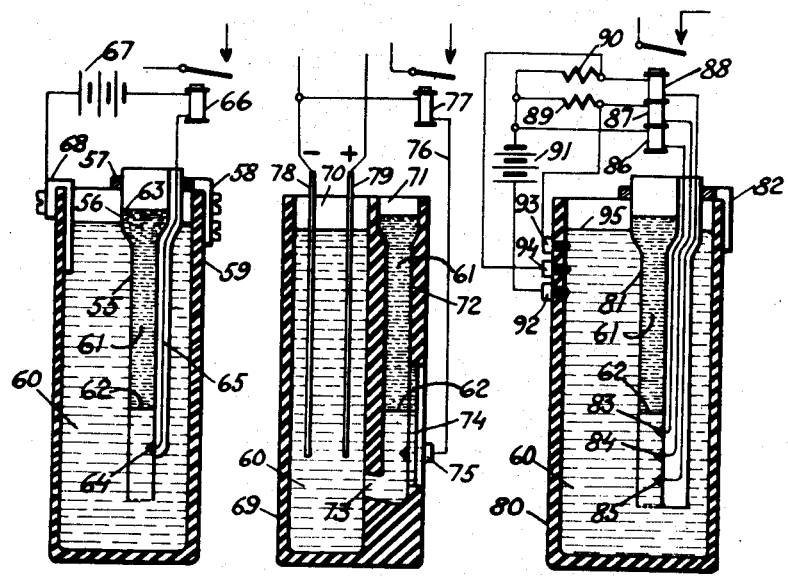

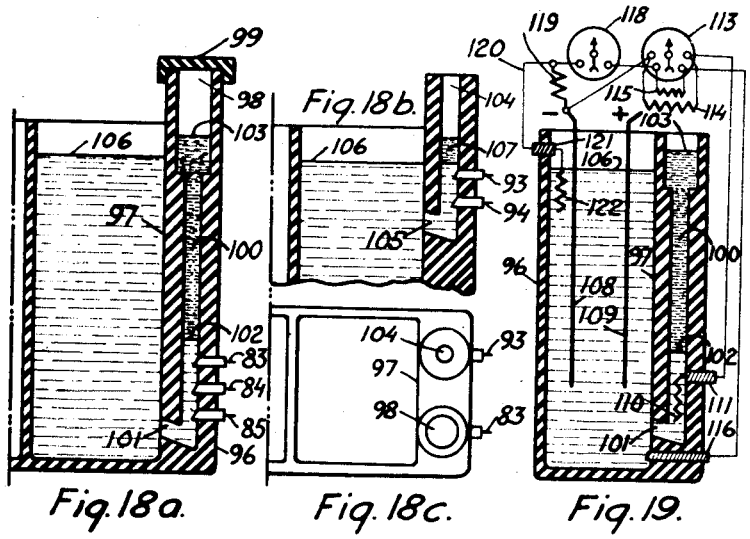
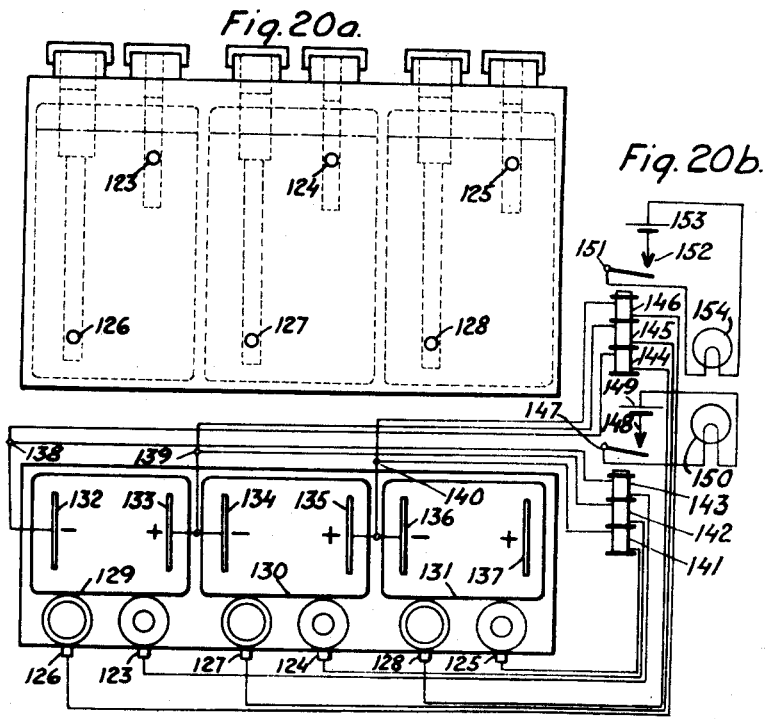

Ernst Martin Thielers
Sten Daniel Vigren
Sven Harold Karsten
INVENTORS
their ATTY.

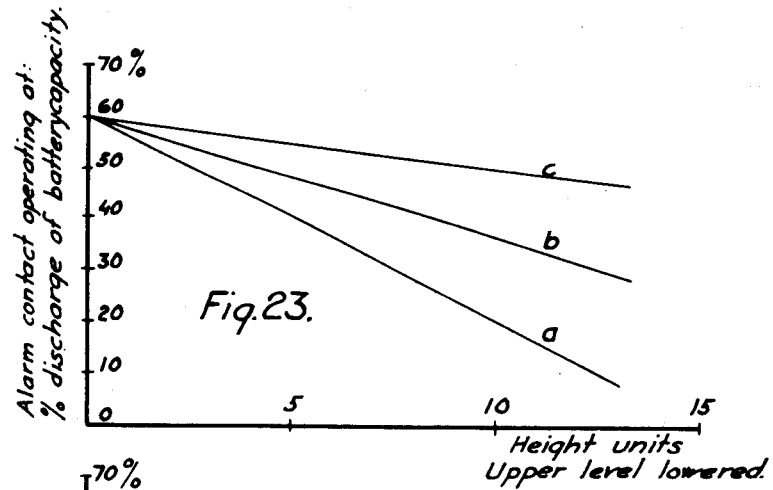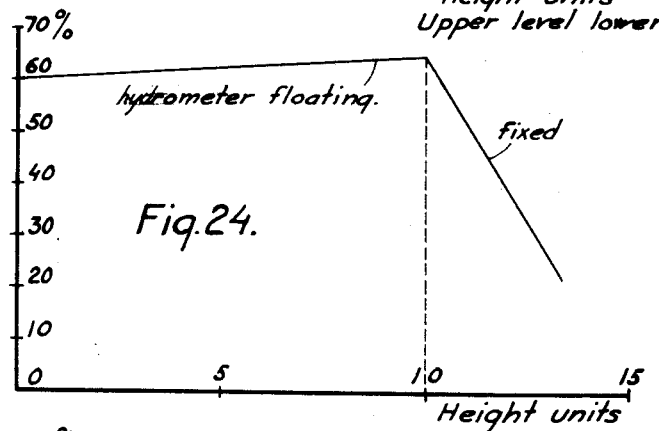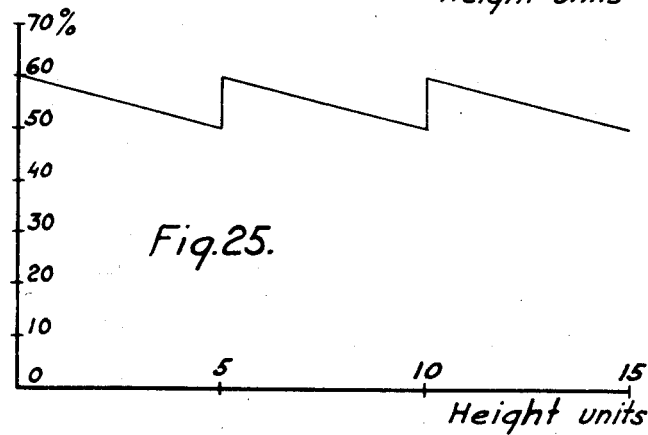

April 23, 1940.　　E. M. THIELERS ET AL　　2,198,351
HYDROMETER AND ARRANGEMENT FOR REMOTE CONTROL OF LIQUIDS
Filed Nov. 5, 1936　　7 Sheets-Sheet 7
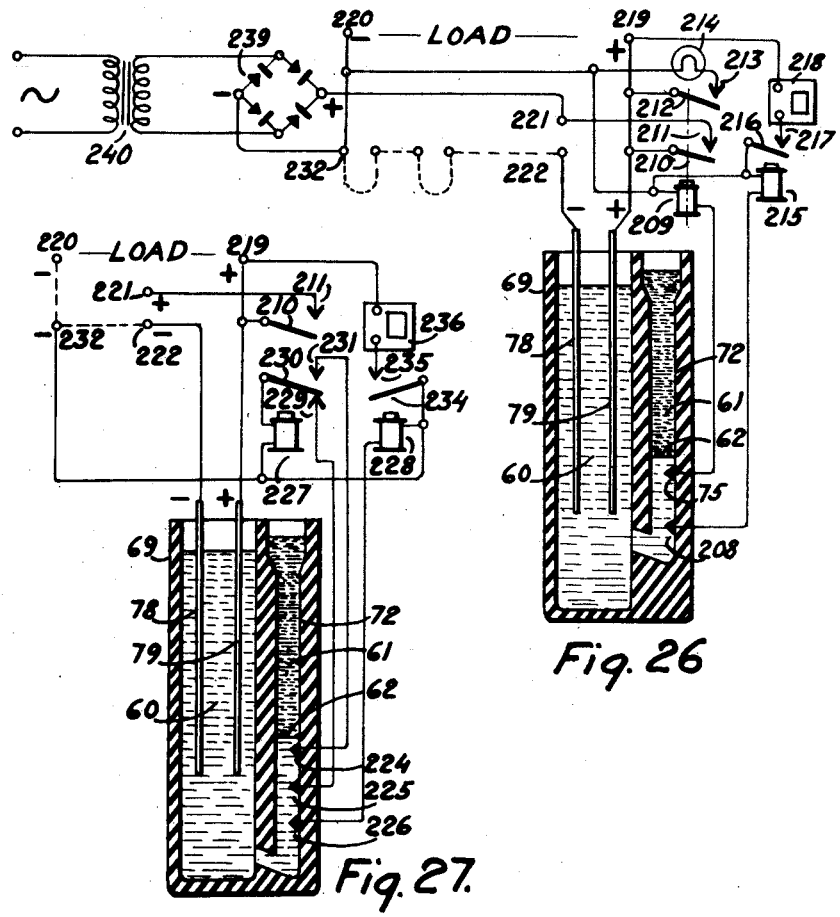
Fig. 26
Fig. 27.
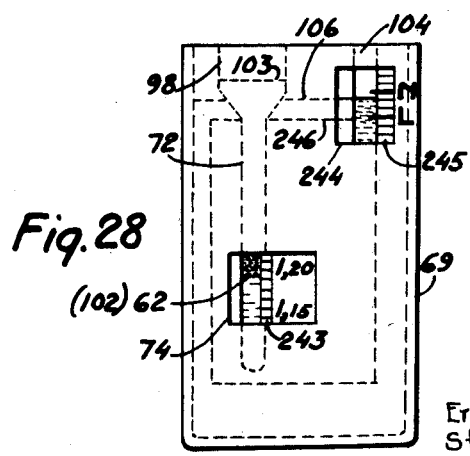
Fig. 28
Ernst Martin Thielers
Sten Daniel Vigren
Sven Harald Kafsten
INVENTORS
By ⎯⎯⎯⎯⎯
　　ATTY.

Patented Apr. 23, 1940

2,198,351

UNITED STATES PATENT OFFICE 2,198,351

HYDROMETER AND ARRANGEMENT FOR REMOTE CONTROL OF LIQUIDS

Ernst Martin Thielers, Sten Daniel Vigren, and Sven Harald Käfsten, Stockholm, Sweden Application November 5, 1936, Serial No. 109,230 In Sweden November 14, 1935

5 Claims. (Cl. 200—85)

The present invention refers to an improved hydrometer, preferably a contact hydrometer for liquid mediums and arrangements for the remote control of said liquid mediums.

An object of the invention is the remote control of liquids and particularly of levels related to a liquid, such remote control comprising the remote indication of the specific gravity of a liquid and/or the indication of the upper level of such a liquid.

Another object of the invention, preferably by storage batteries, is the automatic control of the specific gravity and/or of the upper level of the controlled liquid, comprising the connection to or the disconnection from a current source of a battery cell or battery cells at a certain predetermined specific gravity of the controlled liquid.

Still another object of the invention, having reference especially to chemical industries, where a constant concentration or constant specific gravity of a liquid is important, is the signalling to a remote station of indications of the specific gravity of said liquid.

Above mentioned objects are accomplished according to the invention by the combination in such controlled liquid with means, comprising an indicating liquid, of an electric indicating circuit, said indicating liquid communicating with said controlled liquid, and said electric indicating circuit comprising an electrode forming part of said circuit and associated with said liquids to control the current of said circuit.

The indicating liquid is enclosed in a vessel, which communicates with the container of the controlled liquid, said vessel being arranged in either of the following ways:

1. Attached to a float, which follows the upper level of the controlled liquid, in which case the specific gravity only can be controlled.

2. Attached to a float, following the upper level of the controlled liquid, and after said level has been lowered to a certain predetermined level, the vessel encounters a fixed stop, which converts the hydrometer to a fixed one. This arrangement allows control of both the specific gravity and the upper level of the controlled liquid.

3. Fixedly attached to the wall of the container of the controlled liquid, the vessel preferably consisting of a cavity within the said wall, communicating with the container proper, this arrangement allowing indication of the specific gravity and/or of the upper level of the controlled liquid.

The controlled liquid can be a conductor or non-conductor of electricity, in which case the indicating liquid shall be substantially non-conducting or conducting respectively.

The object of the invention is further accomplished according to the invention by one or more electrodes forming part of one or more electric circuits associated with a current source and remote control receiving means, said electrode or electrodes associated with the container and/or the vessel and/or a hydrometer and associated also with the controlled and the indicating liquids, to control the current or currents of said circuit or circuits.

According to a feature of the invention the vessel confining the indicating liquid can be provided with a graded scale at the upper and/or at the lower level of the indicating liquid to allow, apart from the remote indication also a visible indication of the specific gravity and/or of the upper level of the controlled liquid.

According to another feature of the invention the specific gravity of the indicating liquid is small with respect to that of the controlled liquid and the vessel is smaller at the upper level of said indicating liquid with respect to the area at its lower level, to obtain an increased movement of the upper level of said indicating liquid with respect to the movement of its lower level.

According to a feature of the invention the specific gravity of the indicating liquid differs only slightly from that of the controlled liquid, to obtain an increased movement of the levels of said indicating liquid.

According to another important and preferred feature of the invention the cross sectional area of the vessel is large at the upper level of the indicating liquid with respect to the corresponding area at the lower level of said indicating liquid to obtain a large movement of said lower level.

According to a feature of the invention the vessel is at its upper end open and communicating with the outside air and at its lower end preferably U-shaped also open, there communicating with the container of the controlled liquid.

According to a modified form of a vessel according to the invention the upper end of the vessel is provided with a reduced opening to prevent excessive evaporation of the indicating liquid.

According to another modified feature of the invention, the vessel is closed at its upper end, filled with an indicating liquid heavier than the controlled liquid, said vessel provided with a U-shaped bend at its lower part and immersed in the controlled liquid, which in this case preferably is non-conducting.

According to still another modified feature of the invention and preferably in connection with containers of non-conducting controlled liquids, the indicating medium consists of two liquids of which one is non-conducting and the other conducting of electricity.

According to a feature of the invention a plurality of electric circuits are associated each one with an electrode, said electrodes located in the vessel of the indicating liquid at from another separated and predetermined levels to operate respective circuits at correspondingly predetermined values of the specific gravity of the controlled liquid.

According to a feature of the invention an electrode within the vessel is provided with a contact extension of suitable form for instance in the form of a bar, tube, wire, or the like, said contact extension protruding outside the vessel and shaped to connect to an outside wire.

According to another feature of the invention the indicating liquid with respect to the controlled liquid is chemically indifferent and physically stable, and if of a non-conducting kind, said indicating liquid is preferably an acid-proof oil of mineral origin, and the electrodes and conducting parts of the electric circuits, associated with any of the liquids, consist of non-corrosive materials harmless to said liquids, for instance, platinum, carbon, graphite, lead, cadmium, or the like.

If the container of the controlled liquid is open and particularly if the evaporation of the said liquid is great, the upper lever of the controlled liquid is gradually lowered. The lower level of the communicating indicating liquid is then also lowered with respect to an electrode within the vessel and associated with said lower level of the indicating liquid. If therefore an indication of the specific gravity normally should be obtained at a certain value of said specific gravity at normal upper controlled liquid level, a false indication of said specific gravity will result, when said upper level is lowered.

Besides if part of a liquid solution evaporates as, for instance, the electrolyte of a storage battery, the specific gravity is automatically and falsely increased without any relation to the received charge of the battery plates, wherefore a wrong indication of the state of the battery, viz. charge and/or discharge is obtained.

To compensate for above mentioned possible errors, due to the variations of the upper level of the controlled liquid, the object of the invention is further accomplished by the combination with a preferably fixedly arranged hydrometer according to this invention, of remote signalling receiving means comprising a plurality of electric circuits, each one associated with a current source and with the indicating and controlled liquids, and of a plurality of electrodes, consisting of control electrodes at different levels in the hydrometer vessel and associated with one of the indicating liquid levels, and of upper level electrodes located at different levels in the controlled liquid container and associated with the upper controlled liquid level, the number of said upper electrodes being limited to the number of said control electrodes, less one.

The object of the invention relating to the remote control of the upper level of a controlled liquid is further accomplished according to the invention by the combination with means comprising an indicating liquid, communicating with the controlled liquid within the vessel, communicating at its upper end with the outside air and at its lower end with the container of the controlled liquid, said vessel fixedly arranged with respect to the container of the controlled liquid, of remote signalling receiving means comprising one or more electric circuits associated with a current source and with the indicating and controlled liquids, and of at least one controlled liquid electrode in the container and in said controlled liquid associated with said circuit or circuits, and preferably of a control electrode combined with a resistance, vertically located in the said vessel and associated with the lower level of said indicating liquid, said resistance being connected in one of said circuits together with the controlled liquid in series with said receiving means, or of a plurality of indicating liquid control electrodes at different levels in the said vessel and associated with the lower level of said indicating liquid and with the said circuits.

The object of the invention preferably as related to storage batteries of one or more cells and particularly to the remote control of the specific gravity of the electrolyte of said cell or cells and/or control of the upper level of the controlled liquid or liquids including the connection to or disconnection from a current source of a battery cell or cells at a certain predetermined specific gravity of the controlled liquid, is accomplished in the simplest form by the combination with a hydrometer according to this invention, said hydrometer being floating, semi-fixedly or fixedly arranged with respect to the wall of the container of the electrolyte of a cell, of an electric indicating circuit comprising an electrode forming part of said circuit and associated with the indicating and controlled liquids, and of a second electrode also forming part of said circuit and associated with the said liquids, and of a signal receiving means at a remote controlling station in series with the said electric indicating circuit and with a current source, said electrodes being located and arranged with respect to the controlled and the indicating liquids at such levels and with respect to the circuit, that after discharge or charge of said storage cell until a certain predetermined specific gravity of the controlled liquid is reached and/or the upper controlled level having been lowered to a certain value a signal is received by said controlling means, to give an alarm signal and/or to automatically connect to or disconnect from said storage cell a current source.

The same object in another and general form and particularly with respect to the compensation for variations of the upper controlled level of a liquid, is accomplished by the combination with a hydrometer according to this invention fixedly attached to the wall of the container of the controlled liquid, of a plurality of electrodes comprising indicating electrodes in the vessel and upper controlled liquid level electrodes, the number of said upper level electrodes being the same as that of the indicating electrodes, less one, and of remote signalling receiving means, preferably a relay provided with a plurality of windings associated with a current source and with a plurality of electric remote control circuits, arranged in relation to said electrodes in such a way, that a certain electric remote control circuit at a certain controlled liquid upper level is connected to its corresponding control contact, one winding of the said relay being connected in series with one of said circuits to the highest located control contact and each one of the other windings in series with an ohmic resistance with another electric circuit and with lower control contact, located at a respectively lower level.

The same object in still another and modified form is accomplished by the same arrangement as just mentioned, but with the modification, that the relay is provided with two opposed windings. The upper controlled liquid electrodes are connected each one in series with a resistance preferably of equal magnitude all such resistances being connected in parallel and in series with one of the windings of the relay. The indicating liquid control electrodes, except the top electrode, are connected in series with resistances each one of the same magnitude as those associated with the said corresponding upper level electrodes. The resistances associated with said control electrodes are connected in parallel with another and with the said top control electrode and all in series with the other relay winding.

In another form the object of the invention related preferably to storage batteries and particularly to a continuous indication of the specific gravity of a liquid, including a continuous compensation for the variations of the upper level of said liquid, is accomplished by the combination with a hydrometer according to this invention, fixedly attached to the wall of the container of the controlled liquid, of an electrode connected to a resistance vertically suspended in the vessel of the indicating liquid and associated with its lower level, and of another electrode connected to a resistance vertically suspended in controlled liquid, both resistances associated with the upper controlled liquid level, and of a third electrode associated with the controlled liquid, and of remote signalling receiving means associated with a current source, preferably the same battery, and comprising two indicating organs, preferably galvanometers, of which one is provided with two windings, one of which is connected in series with the battery and the electrode associated with the lower indicating level, and of which the other one is connected in series with the said third electrode and with the winding of the other galvanometer and the upper controlled liquid electrode. The negative pole of the battery is besides connected in series with a resistance to the said upper controlled liquid level electrode.

The object of the invention as related to a plurality of preferably storage battery cells and particularly to the remote control of the specific gravity of the electroytes and/or control of the upper levels of the controlled liquids, is accomplished with remote signalling means by the combination comprising two indicating organs preferably relays, each one provided with a plurality of windings each winding connected to an electric circuit, each such winding associated with a current source and corresponding to an individual container of the controlled liquid, of a hydrometer according to the invention fixedly associated with the wall of one of said containers and provided with an electrode connected to one of said electric circuits and in series with a winding of one of said receiving organs, and of an upper controlled liquid level electrode associated with said container and with said controlled liquid, said electrode connected to another of said circuits and in series with a winding of the other indicating organ. As soon as one of the circuits of any of the indicating organs is interrupted, indication is given or an alarm signal is received.

The same object is accomplished in a similar way but with the following modification: Apart from the said plurality of windings each receiving organ is provided with an additional winding opposed to the said plurality of windings, and of a number of ampere-turns equal to that of the said plurality of windings, less one. As soon as the level of the controlled liquid of any cell sinks below the upper level electrode or the specific gravity of the liquid in any cell falls below a certain predetermined value, the resulting electromagnetic field of the corresponding indicating organ will be zero, and the armature or the indicating means will cause an alarm signal or indication to be made.

The invention will be further described and illustrated in combination with the accompanying drawings, in which—

Figs. 1–3 show vessels immersed in liquids to be measured or controlled, each vessel provided with an indicating liquid communicating with said controlled liquid.

Figs. 4–11 show various forms of floating hydrometers according to the invention.

Figs. 12–14 show various forms of semi-floating hydrometers according to the invention, each one provided with a stop associated with the wall of the container of the controlled liquid.

Figs. 15 and 16 show different forms of a hydrometer according to the invention fixedly associated with the wall of a container of a controlled liquid and with a single electrode, which is associated with the indicating liquid level and remote signalling means.

Figs. 17, 18a and 18b show different forms of hydrometers according to the invention fixedly associated with the wall of a container of a controlled liquid and provided with a plurality of lower indicating liquid level electrodes, said hydrometer associated with a plurality of upper controlled liquid electrodes and with remote control signalling means.

Fig. 19 shows a hydrometer according to this invention fixedly associated with the wall of a container of a controlled liquid, said hydrometer associated with an electrode and a vertically suspended resistance in said hydrometer vessel and with an electrode and vertically suspended resistance in the controlled liquid, and with a signalling receiving means for a continuous remote control of the specific gravity and the upper level of said controlled liquid.

Figure 21:
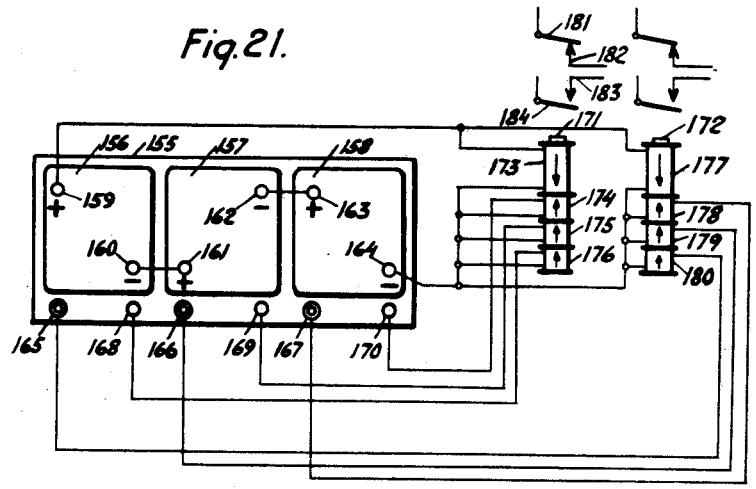

Figs. 20a, 20b and 21 show a 3 cell storage battery associated with a remote signal receiving means, each cell provided with a lower indicating liquid level electrode and with an upper controlled liquid electrode.

Figure 22:
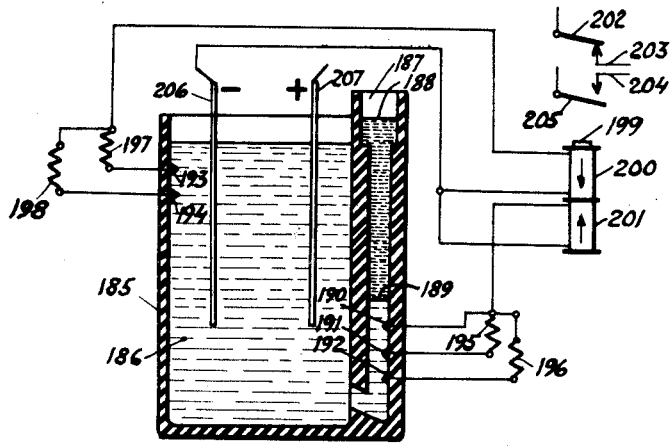

Fig. 22 shows a modified and simple form of a remote alarm arrangement combined with a fixed hydrometer according to this invention, associated with a storage battery.

Figs. 23–25 are curves showing at what indicated percentage of discharge of a storage battery a signal impulse is transmitted for a certain specific gravity, when a hydrometer arranged according to this invention is floating, semi-floating or fixedly arranged.

Figs. 26 and 27 show pilot cells for storage batteries provided with hydrometers and remote indicators according to the present invention.

Fig. 28 illustrates a device according to the invention provided with graduated scales to permit the taking of immediate readings.

Hydrometers known heretofore use the principle of a floating body, according to which principle said body weighs equal to the mass of the displaced liquid volume. Should the specific gravity of the liquid surrounding the hydrometer be changed, the volume of the displaced liquid is changed also, which means that the hydrometer is either raised or lowered. In order to make the movements of the hydrometer sufficiently large, the said hydrometer is made with a lower larger part situated below the superior level of the liquid and with a superior narrow part, whereby a large movement or sensitivity of the hydrometer can be obtained. Such a hydrometer, however, must float freely in the liquid, when readings are taken, which generally needs some manipulating, as the hydrometer has a tendency to adhere to the walls of the vessel or to other objects encountered in the liquid, said adhesion often being so great, that the hydrometer does not freely float in the liquid.

Another inconvenience is the necessity of taking readings at the superior level of a liquid, which often may cause difficulties, due to the liquid being enclosed in a non-transparent vessel.

According to the present invention a hydrometer is constructed according to the law of communicating vessels, which means that the hydrometer comprises a liquid medium, eventually consisting of one or more liquids, enclosed in a vessel, preferably in the form of a tube partly immersed in the liquid, the specific gravity of which shall be measured or controlled, and which we here simply call "the controlled liquid."

The hydrometer liquid medium, simply called "the indicating liquid" is composed of a liquid that does not mix with the controlling liquid, both liquids being communicated and contacting another. The upper part of the vessel is preferably open, communicating with the outside air, although not absolutely necessary as later on will be shown.

As indicating liquid is preferably selected a liquid of a specific gravity lower than that of the controlled liquid. The indicating liquid then rises above the level of the controlled liquid.

Should the indicating liquid be heavier than the controlled liquid, the indicating liquid falls below the level of the controlled liquid.

Figures 1, 2 and 3 serve to demonstrate the general principles of communicating vessels, for varied cross-sectional areas of the indicating liquid vessel. In Fig. 1, $h_1$ indicates the height or vertical distance between the common lower level of both liquids and the upper level of the controlled liquid.

$h_2$ indicates the height or vertical distance between the upper level of the controlled liquid and the upper level of the indicating liquid. $s_1$ is the specific gravity of the controlled and $s_2$ is the specific gravity of the indicating liquid.

The following known law governs the relation between the specific gravities or level differences between respective liquids:

$$\frac{h_1 + h_2}{h_1} = \frac{s_1}{s_2}$$

It is easily understood that if a large movement is desired of the indicating medium in the upper part of the vessel the cross-section area of the lower part of the vessel, immersed in the liquid, shall be larger than that of the upper part, as shown in Fig. 2.

If on the contrary a large movement of the indicating medium is desired in the lower part of the vessel, the immersed part of the vessel shall have a cross-sectional area smaller than that of the upper part, as shown in Fig. 3.

In order to obtain an indication of any change of the specific gravity of a controlled liquid, it is necessary that the level of the said controlled liquid is constant in relation to a hydrometer vessel. This feature is obtained in a certain form of the invention if the hydrometer vessel is arranged in a floating condition, sustained for instance by a float or buoy, as shown in Figs. 4–11. If a visible reading of the movements of the upper level of the indicating medium is desired, a form of the vessel is preferably used as in Fig. 2, in order to obtain an augmented movement of the upper level of the indicating medium in relation to the movement of its lower level, said upper part of the vessel being provided with a suitable graded scale.

It is also easily understood that said augmented movement of the upper indicating liquid in a vessel of the form shown in Fig. 2 will be still further increased if the specific gravity of the indicating liquid is small in relation to that of the controlled liquid.

In the same way it is understood, that if a vessel of a form similar to that of Fig. 3 is used the movement of the lower level of the indicating medium will be larger than that of the upper level.

On the other hand it is also understood and easily proved that a large movement of the lower level of the indicating liquid is obtained, if the difference of specific gravity of the indicating liquid is small with respect to that of the controlled liquid.

When the hydrometer is used for the remote control of a liquid, which is the principal object of the invention, it is advisable to use the movements of the lower level of the indicating liquid, combining the form of the vessel as in Fig. 3 with an indicating liquid of a specific gravity only slightly differing from that of the controlled liquid, in which case a great sensitivity of indication is obtained.

The remote indication of the conditions of a controlled liquid is accomplished by the indicating liquid, which by its movements caused in the communicating vessels, interacts with one or a plurality of electrodes associated with electric circuits, whereby said circuits are influenced or operated by the interruption, closing, changing of the ohmic resistances, induction resistances or capacities associated with said circuits.

The various uses of a hydrometer for remote control of a liquid is shown in Fig. 4 and following. In Fig. 4, its simplest form, 1 is a float, which the hydrometer vessel 4 is attached to; 2 is the container of the controlled liquid 3; 5 is the indicating liquid, 6 the upper level of the said indicating liquid and 7 is the lower level of same liquid communicating with the controlled liquid 3 at the same level. 8 is an electrode within the vessel 4 and shown in contact with the controlled liquid. 9 is a conductor, preferably insulatingly enclosed in the wall of the hydrometer vessel, and connected to contact 10, located on the float 1. The controlled liquid is in this case preferably a conducting medium of electricity, for instance, the electrolyte of a storage battery, and the indicating liquid an insulating medium, preferably an acid-proof oil. The hydrometer works in the following way:

Upon lowering of the specific gravity of the controlled liquid 3, the column 5 of the indicating liquid is lowered and level 7 will gradually pass below electrode 8, insulating same from the conducting medium 3, eventually interrupting a remote control circuit (not shown), established between the said electrode 8 and a contact or electrode to be immersed in the controlled conducting liquid.

The same numbers indicating the same or similar parts are used also in the following figures.

In Fig. 5 a hydrometer vessel 4 of U-shaped form is used, communicating at its upper end with the outside air and at its lower end with the container of the controlled liquid 3. Two electrodes 8 and 13 insulated from each other at the same level inside the vessel is here used, to show the principle of the invention. 9 and 11 are insulated conductors communicating electrodes 8 and 13 with contacts 10 and 12 respectively, said contacts located on a float supporting the vessel 4 for outside connections to a remote signal receiving means 14 in series with a current source 15. The hydrometer vessel is preferably given an U-shaped form at its lower part to prevent the entering as gas bubbles into said vessel, which for instance, in a storage battery otherwise might take place, if its lower open end 4" were facing downwards.

A hydrometer according to Fig. 5 can be used for remote control of a conducting electrolyte, in which case the indicating liquid is a non-conductor. If the controlled liquid is not a conductor, the indicating liquid must be a conductor, for instance, acid. In such case a hydrometer according to Fig. 10 may be used.

The hydrometer operates for a conducting controlled liquid in the following way: Fig. 5 shows the controlled liquid of normal specific gravity with the remote control circuit closed according to the following circuit: Positive pole of battery 15, contact 12, conductor 11, electrode 13, controlled liquid in lower part of hydrometer vessel, electrode 8, conductor 9, contact 10, relay 14, negative pole of battery 15. Relay 14 has its armature energized and its make contact closed under normal conditions. Supposing that the controlled liquid is an electrolyte of a discharging storage battery, the specific gravity of said electrolyte is gradually lowered, whereby the indicating liquid column of, for instance, insulating oil is lowered after a time enclosing the electrodes 8 and 13, thus interrupting the above mentioned circuit. Relay 14 is de-energized and its break contact closed, whereby either an alarm circuit can be closed (in the same way as shown in Fig. 6) and/or a charging source be connected to said storage battery by means of relays 209 and 227, illustrated in Figs. 26 and 27, respectively.

Should the controlled liquid be a non-conductor and the indicating liquid a conductor of electricity, the operation of the remote control circuit is inverted. Should thus the lower level of the indicating liquid be located as shown in Fig. 5, the circuit is interrupted, and will be closed as soon as the conducting indicating liquid medium encloses electrodes 8 and 13.

Any desired combination for the control of the conditions of said liquid can be made, such as remote indication of a certain specific gravity, the connection and disconnection of an electric circuit associated with said controlled liquid etc. By using several hydrometers such as shown in Fig. 4, but with the respective contact electrodes at different levels, remote indication can be obtained for varying specific gravities. Instead of using several hydrometers, however, the same result can be obtained by one hydrometer provided with two or more electrodes in the same hydrometer, located at different levels, each electrode independent of the others, as shown, for instance, in Fig. 6, Fig. 8, Fig. 11, Fig. 17 and Fig. 18.

In Fig. 6 electrode 8 can be used in the same way as in Fig. 4, utilizing an additional contact at a lower level, immersed in the controlled liquid, which in such a case is conducting.

In Fig. 6 the said additional contact 16 is enclosed in the vessel in the form of an electrode, which electrode 16, can be used in combination with an additional circuit. Numerals 15 designate the positive and negative plates of a storage battery, the acid 3 of which shall be observed and controlled. 14 is an alarm relay associated with the upper electrode 8 of the hydrometer 4. Said alarm relay 14 is provided with contacts $C_1$ and $C_2$ which control the signal device which in this case, is formed by a lamp $S_1$. 14' is another relay associated with the lower electrode 16 of the hydrometer 4. Relay 14' is provided with contacts $C_3$ and $C_4$ which control the signalling lamp $S_2$. The operation of hydrometer 4, shown in Fig. 6, is as follows: When the battery is fully charged the lower level 7 of the indicating liquid 5 (which is an insulator) is situated above the electrode 8. Both signalling relays 14 and 14' are energized according to the following circuits: Positive pole 15, electrolyte 3, electrode 8, insulated conductor 9, winding 14, and negative pole 15 of the battery. The contacts $C_1$ and $C_2$ are open. In a similar way relay 14' is energized over electrode 16 while contacts $C_3$ and $C_4$ remain open.

Upon discharge of the storage battery the specific gravity is gradually lowered, whereby the indicating liquid column 5 and its lower level 7 sinks in proportion until electrode 8 is passed and entirely insulated by the said indicating liquid. The circuit of relay 14 is then interrupted. Relay 14 is de-energized and contacts $C_1$ and $C_2$ are closed, whereby lamp $S_1$ is lighted, indicating that for instance 50% of the charge of the storage battery is taken out. Lamp $S_1$ is lighted according to the following circuit: Positive pole 15 of battery, lamp $S_1$, contacts $C_2$, $C_1$ and negative pole 15 of said battery.

If the discharge of the battery is continued until the lower indicating level 7 passes electrode 16, another and last alarm signal is given, when the circuit of relay 14' is interrupted, and alarm lamp $S_2$ is lighted, thereby indicating that the maximum allowable discharge has already been made and that no further discharge may be made without risk of damage to the battery.

A charging current for the storage battery can automatically be started at a certain value of the specific gravity of the electrolyte and can automatically be interrupted at another value as shown for example in Fig. 27.

The electrodes can be arranged in varied manners. Thus the electrodes can be fixed in the wall of the hydrometer vessel, whereby the leads to said electrodes are insulated, if necessary. Another way of effectively insulating the leads, consists in providing the hydrometer vessel with an outside vessel or tube, below sealed in a convenient manner to the interior vessel, and the leads passed in the hollow compartment between said vessels. See, for instance, Figs. 5, 6, 8 and 17.

Figure 7:
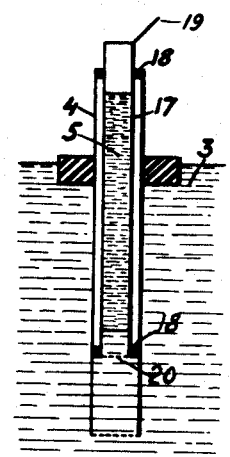

When the hydrometer liquid is insulating and the leads can be placed inside the vessel, no extra insulation of the leads are necessary, as the liquid itself serves as insulation, see Figs. 7, 12, and 13. In such a case wires, tubes, bars or the like can be used as conducting means, said wires, tubes, etc. to be long enough to reach outside the upper border of the hydrometer vessel, where, for instance, in Fig. 7 the conducting tube 17, inside vessel 4 and attached thereto by insulations 18, is provided with contact 19 at its upper part to connect to an outside wire. The lower part 20, of said tube of conducting material serves as electrode associated with the controlled liquid.

Figure 8:
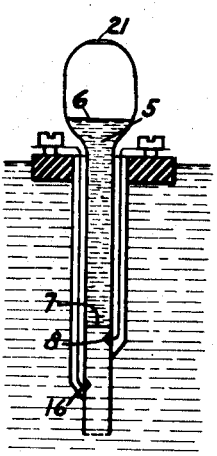

In Fig. 8 the hydrometer vessel is wider at its top than at its bottom, in order to obtain an increased movement of the lower level of the indicating liquid. It is easily understood, that upon increase of the specific gravity of the controlled liquid, the lower level of the narrow column of the indicating liquid moves a further distance than the upper level of the wider column.

Thus the total counter balancing height of the indicating column shrinks for increased specific gravity of the controlled liquid and increases for lowered specific gravity of same. An excellent way of obtaining large movements of the said lower level or great sensitivity is accomplished by using an indicating vessel of the shape shown in Fig. 8. The upper part of the vessel is nearly closed and provided with a small opening 21, only to prevent evaporation of the indicating liquid, and also to prevent the entrance of foreign substances.

Figure 9:
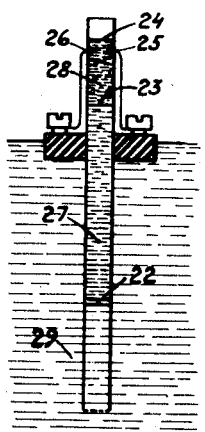

Another form of indicating organs of hydrometers can be used, consisting not only of a hydrometer liquid, but also of a body floating on said liquid, which body preferably is liquid as indicated in Fig. 9. The electrodes, contacts or the conducting parts in direct connection with the current circuits are then generally located in such a way, that they cooperate with the indicating organs, situated in the upper part of the hydrometer.

In Fig. 9, 29 is a controlled liquid; 27 is a preferably conducting liquid of an indicating medium enclosed in a hydrometer vessel and 28 is a non-conducting medium above the liquid 27 in the same hydrometer vessel. 25 and 26 are electrodes immersed in the non-conducting indicating medium. This hydrometer operates in the following way: Normally an outside circuit connected to electrodes 25 and 26 at the same level is open on account of the non-conducting medium 28. Upon ascending of the indicating column, and level 23 rises, electrodes 25 and 26 are enclosed by the said conducting liquid column 27, and the said circuit for remote control is closed through the conducting column 27.

Other variations of two indicating liquids and the electrodes are of course possible.

Figure 10:
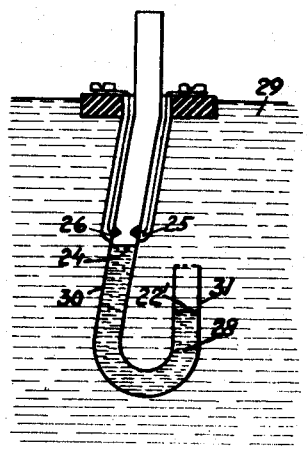

Instead of using two or more indicating mediums as above described, only one medium can be used, especially when the controlled liquid is non-conducting and lighter than the indicating medium, as shown in Fig. 10. In said figure, 29 is a non-conducting controlled liquid, for instance, a hydrocarbon derivative; 28 is a conducting indicating medium heavier than the controlled liquid. The hydrometer vessel 30 is provided with an U-shaped bend in its lower part, the contained indicating liquid communicating with the controlled liquid at level 22′. Two electrodes 25 and 26 at the same level are associated with the upper level 24 of the indicating liquid.

This hydrometer operates in the following way: At normal specific gravity of the controlled liquid or below a certain value, the remote control circuit is opened, as the indicating upper level is below electrodes 25 and 26. Upon increase of the specific gravity the level 24 of the indicating column rises and gradually encloses contacts 25 and 26, closing a remote control circuit.

It should be noticed that in this form of hydrometer, it is only the difference in height of the two columns in the U-shaped bend of the indicating liquid, that takes part in the balancing of the controlled liquid column at level 22′ according to well known principles of communicating liquids and vessels.

As the indicating results in this case will be dependent on the barometric pressure, should the upper part of tube 30 be closed, and vacuum existing above level 24, correction at a remote observation point could be made according to the reigning barometer pressure.

A hydrometer according to Fig. 10 may serve to control the concentration for instance of a chemical insulating compound in a manufacturing process where the insulating compound to be measured is lighter than the conductive indicating liquid of the hydrometer which may be an acid or the like.

Figure 11:
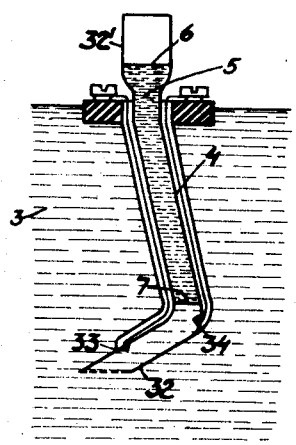

Fig. 11 shows a hydrometer for increased movement of the indicating liquid longitudinally between controlling electrodes 33 and 34 at different levels of the hydrometer vessel. Said vessel 4 is provided at its lower end with a sideway bend 32 and at its upper end with an increased cross-sectional area 32′. Electrodes 33 and 34 are located in the bent part 32 of the vessel at vertical levels, slightly separated from each other, but considerably separated longitudinally to allow great sensitivity in combination with the said increased upper cross-section.

In order to safeguard the correct operation of the hydrometer it is necessary that the materials used do not change, nor do react with the controlled liquid, and that no physical changes occur, such as diffusion or evaporation. These phenomena can be prevented by choosing suitable indicating liquids.

When the controlled liquid is a conductor, for instance, an acid or a solution, the indicating liquid may be an electrically insulating acid-proof mineral oil, preferably of petroleum origin, free from acids or any other ingredients which will attack the materials with which it comes in contact. On the other hand, if the controlled liquid is an electric insulator, for instance, a petroleum distillate, the indicating liquid may be an acid or a conducting solution of a salt, such as for instance sulphuric acid or sulphate of copper.

The conducting parts, like electrodes, contacts, leads, etc., which are located in such a manner, that they get in contact with the hydrometer liquid and with the controlled liquid, must be made of materials, that are not damaged by said liquids, nor must said materials react with the liquids. The materials, which preferably can be used either alone or in combination with another, which must be selected from case to case are the following: platinum, carbon, graphite, lead, cadmium and the like.

The electric remote control circuits to be operated by the indicating organs of a hydrometer uses as a rule current from external sources of either direct or alternating current.

In the case of the indication of the specific gravity of a storage battery, circuits can be arranged to use the needed current from the storage battery itself.

The remote control circuits as a rule may use relays or galvanometers as indicating organs, which in its turn can be arranged to give a visible or audible signal either directly or by means of secondary organs.

In the case of storage batteries, preferably of the lead and acid type, the described hydrometer can serve as already mentioned in a very useful capacity, viz. for the control of an automatic charging arrangement with or without signals. Such arrangement is illustrated in Figs. 26 and 27 which show fixed hydrometers whose operation is like that of the floating hydrometers according to Figs. 4 to 11, if the level of controlled liquid remains unchanged.

According to the desired results different methods can be used. One method comprises the starting of the charging current as soon as the acid of the storage battery upon discharge has reached a certain low specific gravity by the intervention of a low level electrode (e. g. electrode 225, Fig. 27) in a remote control circuit. The charging current is again interrupted, when the specific gravity of the controlled liquid has reached such value that an upper electrod (e. g. electrode 224, Fig. 27) is actuated.

This last mentioned specific gravity of the acid will always be lower than that corresponding to a full charge, wherefore in known ways a so-called supplementary charge with low current intensity can be employed.

In a suitable manner a third contact (see e. g. contact 226, Fig. 27) can be arranged in the hydrometer vessel to correspond to such a low specific gravity of the acid, that an alarm signal should be given, which is specially useful in the case of a current interruption.

Another method (illustrated in Fig. 26) comprises the starting of the charge of the battery as soon as the specific gravity of the acid has been lowered to such a value that the top electrode is actuated, the charging current to be interrupted again as soon as the initial normal specific gravity of the acid is reached. The intervals of charge will in this method be more frequent than in the first described method. This arrangement may also be combined with an alarm signal.

The hydrometer can also be used in combination with alkaline storage batteries, in which case the movement of the indicating medium will be smaller than in a lead storage battery. It should be noted, that in connection with alkaline storage batteries the specific gravity of the controlled liquid increases with the discharge of the battery.

Eventually and as an alternative it is convenient in the practical construction of the hydrometer to form the lower part of the hydrometer vessel somewhat pointed (see e. g. Figs. 4 and 6), in order to make the communicating part between the vessel and the controlled liquid container relatively narrow. In this way gas bubbles are prevented during charging from entering the hydrometer vessel, and besides this form may prove useful in mounting the hydrometer in the storage battery container, as a floating hydrometer can be adjusted outside the storage battery, the hydrometer to be provided with a rubber tube stopper to be removed after the introduction of the hydrometer in the storage battery liquid.

Modified forms of the invention, in which a hydrometer is semi-floatingly arranged are shown in Figures 12, 13, and 14, whereby to a certain degree compensation is made for varying upper levels of the controlled liquid.

If a hydrometer were fixedly attached with respect to the controlled liquid container, the hydrometer would indicate changes of the specific gravity as well as changes of the upper level of the controlled liquid, because upon lowering of said level the lower indicating liquid level will be correspondingly lowered.

An alarm signal can therefore be obtained earlier with a low upper controlled liquid level for a small variation of the specific gravity, than with a normal upper controlled liquid level. It is, however, understood that the upper level of the controlled liquid cannot be allowed to sink indefinitely without impairing exactness of the indicated value of the specific gravity. Besides it is clearly understood, that in a storage battery the upper level of the controlled liquid should always be kept at a certain level above the plates.

This is particularly important with respect to batteries without daily supervision and an alarm signal should be given not only for a discharged battery, but also for a predetermined lowest permissible upper controlled liquid level. Said object is accomplished according to one solution of the problem, shown in Figs. 12 to 14, whereby the hydrometer at a certain normal upper controlled liquid level is floatingly arranged and thus follows said level, but at another lowest permissible level the hydrometer vessel is stopped and fixedly arranged with respect to the controlled liquid container. From this lower level on and at predetermined values, the hydrometer will now give an alarm signal and for indication of the specific gravity and/or of additional changes of the upper controlled liquid level.

In Fig. 12 the storage battery container 41 is provided with a holder 42, submerged in the liquid attached to the wall of the container, said holder being provided with a hole to freely allow the hydrometer vessel 35, which consists of insulating material such as for instance glass or composition, to pass through, but to stop the float 40 upon contacting the said holder and therewith also the hydrometer vessel. 38 is an electrode suspended from the contact 39, attached to the cover 44 of the hydrometer vessel, said electrode making contact in the lower part of the hydrometer vessel with the controlled liquid 37. The indicating liquid preferably an oil insulates the electrode above its lower level 7, and is completely insulated when said level is sufficiently lowered.

Figs. 13 and 14 show other forms of the hydrometer, which here is partly movable within a cavity (51) in the wall of the controlled liquid container, said cavity communicating with the said container through the opening 50. Said cavity is provided with a stop 43 against which the float 40 together with the hydrometer vessel 35 will rest upon lowering of the upper controlled liquid level. The outside connection to the electrode 38 is made without friction, in Fig. 13 by means of a spiral spring 45 and contact 47, and in Fig. 14 by means of an additional electrode 54 dipping in a conducting medium 53 in the interior upper part of the hydrometer vessel. Said vessel is in this case provided with an interior upper cup 52 attached to the vessel, said cup retaining the said conducting liquid 53. The electrode 38 is attached to said cup and in contact with its conducting liquid. The electrode is preferably enclosed in an insulating sleeve 52', which serves to conveniently strengthen the said electrode part of its length. The lower part of the electrode is, however, conducting to make proper contact with the controlled liquid 37. By giving the upper electrode 54, in Fig. 14, a suitable length it is possible to arrange a complete interruption of the controlling circuit at a certain lowest allowable controlled liquid level.

The different arrangements above described can better be understood from diagrams shown in Fig. 23, which diagrams or curves as well as those shown in Figs. 24 and 25, show curves relating to an alarm contact or an electrode actuated or operated at a certain percentage discharge of the battery capacity, as marked on the vertical axis as a function of lowered height units of the upper controlled liquid level, marked on the horizontal axis.

Fig. 23 relates to a fixed hydrometer. The line *a* applies to a normal storage cell of small size with a relatively short hydrometer. If the hydrometer at normal controlled liquid level gives an alarm at 60% of the capacity discharged, said alarm will be given at a level 5 height units below the normal level for but 40% of the capacity discharged and at a level 10 height units below the normal level for only 20% of the capacity discharged. Line *b* refers to a larger storage battery cell and corresponding longer hydrometer, wherefore minor changes of the upper controlled liquid level do not matter very much. It should also be taken into consideration, however, that upon lowering of the upper level the acid is concentrated, and that it is possible in certain types of cells to obtain a fairly level line, which means that with a fixed hydrometer a signal could be obtained at nearly the same percentage of discharge independently of the level, see curve *c*.

With a hydrometer arranged according to Figs. 12 and 14 a so-called signal-curve is obtained as shown in Fig. 24. Upon lowering of the upper controlled liquid level by evaporation, alarm-signal is obtained after a discharge somewhat over 60%, due to the corresponding increase of the concentration of the acid. When, for instance, at 10 height units lowered level the hydrometer becomes fixedly attached to the container by the stop 42 in Fig. 12 or stop 43 in Fig. 13, the signal-curve bends downwards as shown in Fig. 24.

With a hydrometer arranged according to Figs. 12 to 14, an alarm signal can be obtained by interruption of the alarm circuit as before mentioned, independently of the discharge and the curve in Fig. 24 drops as indicated by the punctured line.

A fixed hydrometer according to this invention is used in Figs. 15-20, of which Fig. 15 shows a type of hydrometer, which can be mounted in any container and Fig. 16 shows a type of hydrometer located in the wall of the container proper, which container preferably is made of hard-rubber or similar plastic material.

In Fig. 15, 59 is a container of the controlled liquid 60; 55 is the hydrometer vessel provided with an increased upper cross section 56, containing the indicating liquid 61. The vessel is fixedly attached to the container wall 59 by means of the holder 58. Electrode 64 and conductor 65 are associated with the vessel and connected in series with relay 66, battery 67 and contact 68 dipping into the controlled liquid 60.

This hydrometer operates in the following way: Alarm- and/or control relay 66 is energized when the lower indicating liquid level 62 is situated above electrode 64 according to the following circuit: Battery 67, contact 68, controlled liquid, electrode 64, conductor 65, relay 66, battery 67. Upon lowering of the specific gravity of the controlled liquid by discharge of the battery cell, or by lowering of the upper controlled liquid level, the indicating liquid level 62 gradually drops below electrode 64, which is then insulated, and the above electric circuit is interrupted, whereby the relay is de-energized and a signal is given.

The circuit is preferably arranged in such a way, that the current enters the electrode 64, to prevent corrosion.

In Fig. 16 the hydrometer is enclosed in a cavity 71 in the wall of the container 69, which cavity communicates by the upwards pointing opening 73 with the container proper. The cavity can eventually be provided with a window 74, which can be provided with a graded scale (243, Fig. 28) to allow visible indication of the indicating liquid level 62. As current source the battery itself is here used and connected in series with the relay 77. The operation of this arrangement is very similar to that described in Fig. 15. Areometers or hydrometers according to Figs. 15 and 16 will function according to any of the curves *a*, *b* or *c* of Fig. 23. In cases where said functioning is not sufficiently regular, suitable additional arrangements can be provided to bring the signal-curve to approach more closely the ideal curve value for alarm signal to be given at about 60% discharge of the capacity of a storage battery. Such arrangements are shown in Figs. 17 and 18.

In Fig. 17 the hydrometer vessel 81 is provided with a plurality of electrodes 83, 84, 85, located at different levels with respect to the indicating liquid level 62. Each one of said electrodes are connected to a remote control circuit in series with a winding, 86, 87, 88 respectively of a receiving means. Windings 87 and 88 are connected in series with resistances 89 and 90 respectively. At normal controlled liquid level said windings are short circuited by means of upper level electrodes 93 and 94 respectively, said electrodes located in the container 80. 92 is an extra electrode located in the container and connected to the plus pole of current source 91 and in contact with the controlled liquid.

The arrangement operates in the following way: At normal controlled liquid level, the indicating liquid level 62 is lowered in relation to lowered specific gravity of the controlled liquid 60, until electrode 83 is insulated from the controlled liquid. The signal receiving means is normally energised through winding 86 according to the following circuit: Battery 91, electrode 92, controlled liquid 60, electrode 83, winding 86, battery 91. Upon insulation of electrode 83 from the said controlled liquid said circuit is opened and the armature of said de-energised signalling receiving means closes a secondary alarm circuit. It should be noted that the other windings 87 and 88 hereby are short-circuited by level contacts 93 and 94. Should, however, in the meantime the upper controlled liquid level 95 have fallen below electrode 93, said short-circuit of winding 87 is removed and current passes said winding over electrode 84 according to the following circuit: Battery 91, electrode 92, controlled liquid 60, electrode 84, winding 87, resistance 89, battery 91. The signal receiving means therefore continues to be energised. The indicating liquid level 62 now must move below electrode 84 in order to interrupt the last mentioned circuit and de-energise the signalling receiving means. Should, however, in the meantime the controlled liquid level 95 have continued to fall below electrode 94, insulating same, the relay winding 88 will now be passed by a holding current in the same way as before described. In such a case the indicating liquid level 62 must fall below electrode 85 before an alarm signal can be obtained.

The signal-curve will according to above arrangement look like the curve shown in Fig. 25.

Figs. 18*a*, 18*b*, and 18*c* show a modified form, according to which a hydrometer vessel in a storage battery cell consists of a cavity in the cell wall, and the upper level electrodes are located in another cavity of said cell wall. Said form is particularly suitable for hardrubber cells of portable storage batteries. In order to eliminate effects of surface currents often associated with storage batteries, which sometimes can be of such magnitude that for instance, the upper level electrodes are not completely insulated from the acid although said acid level has fallen below said electrode, it is advisable to locate said level electrodes in a separate vessel, for instance in the wall of the cell and communicating with the cell proper as shown in Fig. 18b. In such a case a small layer of insulating oil 107 is placed floating on the acid in the vessel 104, which vessel besides is provided with electrodes 93 and 94, and communicates with the battery cell proper.

Fig. 18a is a part sectional view of a hard rubber cell 96 of a storage battery, the hydrometer comprising a cavity 98 of the wall 97 of said cell.

Said cavity is at its upper part closed by a cover 99 provided with a small opening to communicate with the outside air and at the lower end of the cavity communicating with the cell proper through opening 101, slightly pointing upwards. 83, 84 and 85 are electrodes in the wall of said cavity. 100 is the indicating liquid preferably an acid-proof oil with upper level 103 and lower level 102.

Fig. 18c, is a plan view of Figures 18a and 18b.

All electrodes shall consist of acid-proof and against electrolysis permanent material, for example, platina, carbon, graphite, cadmium, lead and the like.

With arrangements shown in Figures 17 and 18 with combined controlled liquid level and indicating liquid level electrodes a step-wise compensation is obtained for changes of the controlled liquid level. See Fig. 23.

Should a continuous compensation for eventual changes of the controlled liquid level be desired, such a compensation can be accomplished, if the hydrometer is arranged as shown in Fig. 19, in which the controlled liquid level electrodes and the indicating liquid level electrodes are substituted by resistance 122 and resistance 110 respectively. Instead of signalling relays the indicating receiving means consists of two electrical indicating meters or galvanometers 113 and 118, of which 118 is intended to show the upper level of the controlled liquid and 113 the specific gravity of the said liquid. The last mentioned instrument is provided with two windings 114 and 115. 116 is an extra electrode in the controlled liquid to close the circuit to the plus pole of the battery, if as current source is used the same storage battery. 119 is an exterior resistance connected in series with the negative pole of the battery.

The arrangement, particularly suitable for starting batteries for automobiles and the like, operates in the following way:

If at normal acid level 106 the battery is fully charged, current flows from the storage battery as follows: Plus pole 109, acid 106, resistance 110 (short-circuited by the acid), contact 111, conductor 112, winding 114 of meter 113, minus pole 108, acid 106 and back to plus pole 109. The meter now gives indication that the battery is fully charged. Winding 115 of meter 113 and meter 118 are shortcircuited over the level contact 121 and the resistance 122, now short circuited by the acid 106. Should the specific gravity of the acid be lowered upon discharge of the battery, but the upper level remain constant, the insulating indicating liquid level 102 sinks and gradually connects into aforementioned circuit more and more of the resistance 110. The current in said circuit is gradually lowered and corresponding indication is noticed on the meter 113, on which can be directly read the specific gravity of the acid or the percentage of discharge, depending upon the indicating scale.

Should the upper acid level 106 sink, and the specific gravity remain constant, the short-circuit of resistance 122, due to the acid is gradually removed, and thereby the shortcircuit of the meter 118 and winding 115 of meter 113. A current will then flow as follows: Positive pole 109 of battery, acid 106, electrode 116, conductor 117, winding 115 of meter 113, meter 118, resistance 119, minus pole 108 of said battery.

The magnitude of the current is determined by that part of the resistance 122, which is connected in series with the circuit. The meter 118 will indicate the height units lowered of level 106. It should be noted, that upon lowering of controlled liquid level 106, the indicating liquid level 102 will fall a corresponding distance, whereby the same part of resistance 111 is gradually connected in series with previously mentioned circuit and winding 114 as part of resistance 122 is connected in series with the other circuit in series with meter 118 and winding 115 of meter 113. The current in winding 114 is then lowered, but this decrease is compensated by a corresponding increase of current in the other winding 115 of meter 113, said windings being cooperating. A full indication of meter 113 is therefore still obtainable. Should however, the specific gravity and the controlled liquid level 106 be lowered simultaneously, the current in winding 114 is decreased more than the other current increases in winding 115, wherefore meter 113 shows a correct indication of the specific gravity.

To obtain a positive insulation of the upper level indicating resistance 122 it is convenient to enclose it similarly as shown in Fig. 18b in a separate fixed vessel, and above the acid level should preferably be placed a small oil layer.

By storage batteries exposed to trepidations, for instance, by automobile and train batteries, said oil layer acts as a damper on the acid level. In order to still more lessen the action of an eventual trepidation, the said vessels should have a relatively small diameter and the resistances 111 and 122 be made relatively long.

It is understood that the invention can be given many other forms than those here shown without parting from the general principles of same.

In Fig. 20a and Fig. 20b is shown a simpler form of signalling means, applied to a 3 cell storage battery of the type used in automobiles and other movable vehicles, where one alarm signal is obtained on lamp 150, should the controlled liquid level fall below a certain value in any of the cells, and another alarm signal is obtained on lamp 154, should the specific gravity sink below a certain value in any of the cells. Two receiving relays are arranged, each one with a winding for each cell. At normal levels or at normal specific gravity in all cells, all windings are under current. The respective relays are, however, so dimensioned that when the current is interrupted in one winding, the corresponding armature is de-energised and the corresponding alarm is given. 123, 124 and 125 are upper controlled liquid electrodes, one in each cell according to construction shown in Fig. 18c. 126, 127 and 128 are indicating liquid level electrodes, one in each cell, similar to construction shown in Fig. 18a.

The arrangement operates in the following way: Winding 141 is operated according to the following circuit: Plus pole 137 of battery 131, electrode 125, winding 141, connection 140, negative pole 136 of battery. In similar way all the other windings are operated. Should the circuit be interrupted at electrode 125 the armature of the relay is released closing contacts 147 and 148, whereby lamp 150 is lighted.

Fig. 21 shows a modified form of alarm arrangement for a storage battery consisting of a plurality of cells. This arrangement comprises two relays 171 for the control of the upper level of the respective electrolytes, and 172 for the control of the specific gravity of the respective cells. Apart from the individual windings shown in Fig. 20b, each relay is provided with an extra winding opposed to the first mentioned windings and of a number of ampere-turns equal in this case to the number of ampere-turns of two of the said individual windings. Should only one of the cells be out of order, for instance, by leakage or short circuit of some of the plates, the corresponding relay releases its armature, giving the corresponding alarm signal, due to the fact, that the magnetic field of the relay will be zero as soon as one individual winding is interrupted.

If there is no danger for such individual cells going wrong the said counteracting windings 173 and 177 can be dispensed with and in such a case the respective relays are adjusted in such a way, that the respective armatures are released as soon as the current in one winding is interrupted. Relay 171 is associated with upper controlled liquid level electrodes 168, 169 and 170, and relay 177 is associated with the indicating level electrodes 165, 166 and 167.

At normal levels and normal specific gravity all windings are energised in circuits similar to the following: Negative pole 164 of cell 158, winding 180 of relay 172, hydrometer electrode 165, positive pole 159 of cell 156 and back through cells 157 and 158 of the battery to negative pole 164 of cell 158.

Fig. 22 shows a modified and simplified form of the remote signalling arrangement shown in Fig. 17 as applied to a storage battery cell. 199 is a relay, provided with two opposed windings 200 and 201 and with break and make contacts 204—205 and 202—203 respectively. Winding 200 is connected to both upper level electrodes 193 and 194, each one in series with equal resistances 197 and 198 respectively. The other winding 201 is connected to all indicating liquid electrodes 190, 191 and 192, the last ones in series with external resistances 195 and 196 respectively. As battery source is used the storage battery cell proper.

The arrangement operates in the following way: At normal specific gravity and normal level of the controlled liquid, winding 200 receives current according to the following circuit: Negative pole 206 of battery, winding 200, resistances 197 and 198 in parallel, 197 in series with electrode 193 and 198 in series with electrode 194, acid 186, positive pole 207 of battery.

In the same way winding 201 receives current over the following circuit: Negative pole 206 of battery, winding 201, electrodes 190, 191 and 192 in parallel, the last two in series with resistances 195 and 196, acid 186, positive pole 207 of battery.

If resistances 197 and 195 are of the same magnitude, windings 200 and 201 will receive equal but opposed ampere-turns over contacts 193 and 191 respectively. In the same way and if resistances 198 and 196 are of the same magnitude said windings will receive equal but opposed ampere-turns over electrodes 194 and 192. Winding 201, however, receives also current over electrode 190 without any resistance in series, wherefore on said account the armature of relay 199 is energised.

If on the contrary the level of the controlled liquid is normal, but the specific gravity drops, and thereby also level 189, the electrode 190 will be insulated. The ampere-turns of windings 200 and 201 will be equal but of opposite action, wherefore the armatures 205 and 202 are released, closing and opening respective secondary circuits over contacts 204 and 203 respectively.

If also the level of the controlled liquid falls below electrode 193 and afterwards below electrode 194, the corresponding parallel circuits of winding 200 are consecutively interrupted. If only electrode 193 is insulated the relay 199 will release as soon as electrodes 190 and 191 are insulated. If both electrodes 193 and 194 are insulated, relay 199 will not release until also electrodes 190—192 are insulated.

In Fig. 26, 69 is a storage battery container, 60 is the electrolyte and 78 and 79 are the negative and positive plates, respectively. A fixed hydrometer vessel 72 is provided in the wall of the container 69. 61 is the indicating liquid column and 62 is its lower level. 75 and 208 represent electrodes, while numerals 209 and 215 designate remote control relays provided with contacts 210—213 and 216—217, respectively. 214 is a pilot lamp and 218 is an alarm buzzer. 221 and 222 are the connecting poles for the charging current source, in the instant case, a rectifier equipment 239 for alternating current, which by means of transformer 240 is stepped up to the proper charging voltage. On the drawing there is shown only one cell of a storage battery, but it should be understood that this cell can be used as a pilot cell for any number of cells, as indicated in dotted lines in the negative pole line, the charge and discharge of many cells being governed by said pilot cell. Binding posts 219 and 220 form the discharge poles of the battery for the load.

The operation of the device is as follows: On the drawing, the pilot cell is shown in its fully charged condition, whereby the indicating liquid level 62 is above the top electrode 62, which is thus in direct contact with the electrolyte 60. Relays 209 and 215 are energized leaving their contacts open according to the circuits described in the following. The supervising and control circuit: Positive pole 79, acid 60, electrode 75, winding 209 and negative pole 78. When the armature is energized, contacts 210—211 and 212—213 are open.

The alarm circuit is energized in the following manner: Positive pole 79, acid 60, electrode 208, winding 215, negative pole 78. When the armature is energized, contacts 216—217 are open.

As soon as the discharge of the battery on a connected load through contacts 219—220 takes place, the specific gravity of the pilot cell is lowered and the indicating liquid column 61 is correspondingly lowered until its lower liquid level 62 passes electrode 75. As soon as said electrode is entirely enveloped by the insulating indicating liquid 61, the circuit of winding 209 is interrupted and its armature released. Contacts 210 and 211 are closed and the following charging circuit is established Plus pole of the rectifier 239, binding post 221, contacts 211 and 210, plus plates 79 of cell 69, electrolyte 60, negative plates 78, binding post 222 in series with any number of cells of the same battery, negative pole of rectifier 239.

The charging is now continued until the specific gravity of the pilot cell again rises and until the lower level 62 of the indicating insulating column 61 passes electrode 75. As soon as contact is established between electrode 75 and the electrolyte 60, the above mentioned circuit of winding 209 is closed and the contact 210—211 is interrupted.

During the charging operation contacts 212 and 213 are closed and the supervision lamp 214 is lighted, indicating that charging is going on. Said lamp is lighted according to the following circuit: Positive pole 209 of pilot cell, contacts 212 and 213, lamp 214, negative pole of battery 220, other cells of battery, binding post 222 of pilot cell, negative pole 78 of pilot cell.

If, on account of unforeseen circumstances, the charging source fails or is interrupted and the specific gravity drops way below electrode 75 and even below electrode 208, alarm relay 215 is energized. The following ordinary circuit lasts: Positive pole 79, electrolyte 60, electrode 208, winding 215, negative pole 220, in series with other cells of the battery, binding post 222, negative pole 78 of pilot cell.

Contacts 216 and 217 are closed, as soon as the insulating indicator liquid 61 surrounds electrode 208, whereby the alarm buzzer 218 is actuated according to the following circuit: Positive pole 219, buzzer 218, contacts 217 and 216, negative pole 220 of battery.

In Fig. 27, 69 is a pilot cell of a battery similar to that shown in Fig. 26. However in Fig. 27, the remote control of the liquid of the pilot cell is carried out in a different way. In Fig. 27, electrodes 224, 225 and 226 are associated with the fixed hydrometer vessel 72. 227 is the charging control winding having contact springs 229—231 and 210—211. Alarm relay 228 is provided with contact springs 234—235 which control the alarm buzzer 236. 221 and 232 are the binding posts where the charging source of the complete battery is connected. 219 and 220 are the binding posts for the discharging load of the same battery.

The operation of this device is as follows: The pilot cell is shown in a fully charged condition with all three electrodes 224, 225 and 226 in contact with the electrolyte 60, and control winding 227 is in energized position, the charging source disconnected from the battery.

Upon discharge through the load 219—220 the specific gravity of the electrolyte 60 is gradually lowered. The lower level 62 of the insulating indicator liquid 61 is correspondingly lowered. When electrode 224 is insulated by the indicating liquid 61, relay 227 is not affected because spring contact 231 is open. However, as soon as electrode 225 is insulated, the following holding circuit is interrupted: Positive pole 79, electrolyte 60, electrode 225, contact 229, contact spring 229, contact spring 230, winding 227, negative pole 232 of battery, negative pole 222 of cell, negative plate 78 of the cell. Winding 227 is thus de-energized, and the continuous make and break contact spring 230 is separated from lower contact spring 229 and contact is simultaneously established between contact spring 230 and upper contact spring 231.

At the same time, contacts 210 and 211 are closed and the following charging circuit is established: Positive charging pole 221, contact 211, contact 210, positive plates 79, electrolyte 60, negative plates 78 of the pilot cell, binding post 222 and negative pole of charging current source 232.

As the specific gravity of the electrolyte 60 of the pilot cell gradually increases, the insulating column of the indicating liquid is correspondingly raised and, as soon as lower level 62 passes electrode 224, the charging current is interrupted due to the fact that winding 227 is again energized according to the following circuit: Positive plates 79 of pilot cell, electrolyte 60, electrode 224, break contact 231, contact spring 230, winding 227, negative battery contact 232, negative plates 78 of pilot cell 69. As the contact spring set 229—230—231 are of the continuous make and break type, contact 231 is not opened until contact is established between contact springs 230 and 229, whereafter a holding circuit is immediately established over lower contact 229 and lower electrode 225, instead of the previous connection over break-contact 230 and upper electrode 224

Simultaneously, contacts 210 and 211 are opened and the charging circuit interrupted. Upon discharge of the battery, the insulating indicator column is again lowered and the cycle is repeated as above described.

If, however, the charging current source should fail and the automatic charging not be started at the proper time, the discharge may continue until, for instance, 90% of the charge has been dissipated corresponding to electrode 226. In such a case, as soon as this electrode has been insulated by the insulating indicator liquid 61, winding 228 is deenergized. The latter is normally energized according to the following circuit:

Positive plates 79, electrolyte 60, electrode 226, winding 228, negative pole of battery 232, negative pole 222 of cell and negative plates 78 of cell.

When winding 228 is de-energized, its armature is released, closing contacts 234 and 235, whereby the buzzer 236 is connected to the following circuit: Positive pole 219, buzzer 236, contacts 235 and 234, negative pole 220 of battery. Electrode 225 can be set to start the charging of the battery after any desired discharge, for instance, after a 50% discharge etc.

Fig. 28 represents a front view for instance, of cell 69 of Fig. 16, with window and graded scale 74, or of an end cell according to Fig. 18a, b, c or of any of cells according to Figs. 20a, b provided with windows for both the lower indicating liquid level 102 and the upper controlled liquid level 106.

In Fig. 28, 69 is the cell container, 72 the indicating liquid vessel, 103 the upper level of the indicating liquid, 62 (102) the lower indicating liquid level, 106 the upper controlled liquid level, 246 the upper edge of a battery plate; 104 is a small vessel in the upper wall of the container communicating with the container proper. 74 is a window of glass, Celluloid or any known suitable synthetic and transparent resin. Window 74 is provided with a visible graduated scale 243, on which the specific gravity of the electrolyte or of the controlled liquid can be directly read through the window by observing the position of the lower indicating level 62 with respect to said scale. 244 is a window of transparent material like window 74, and is provided with a visible scale 245, on which can be read the exact upper level 106 of the controlled liquid.

The present invention fills a greatly felt need with respect to the remote control of liquids in a surprisingly simple way, and this fact is particularly true with respect to storage batteries.

Heretofore it has not been possible to obtain an automatic remote control of the specific gravities and of levels of the electrolytes of storage batteries, which nowadays are so extensively used in various fields as a current source in, for instance, important communication and signalling systems, starting batteries in automobiles, motor trucks, motor boats, aeroplanes, and the like, which all depend upon constant and reliable current supplies.

With other words, the battery or heart of such a system has heretofore had no alarm system whatsoever and breakdowns often occur, due to too lately observed irregularities such as, for instance, a too far gone discharge of a storage battery, evaporation or other loss of electrolyte, with the corresponding loss of capacity and sulphating of the battery plates and the like.

To guard against such irregularities, heretofore personal and often cumbersome inspection has been made at stated and far between intervals.

Apart from the function as a hydrometer, the invention can with great economical advantage and with simple arrangements substitute the complicated mechanical systems and apparatus now used for the remote control and indication of levels of liquids, such as periodical changes of levels of open lakes, tidewaters, water locks, tanks, and the like.

A new field is also opened up for the determination of the specific gravity and therewith the concentration of chemical compounds in all kinds of chemical industries either in the manufacturing of such compounds in continuous operations or when using same in other industries where a constant concentration of a chemical solution or liquid mixture is of importance, as for instance in the sulphate and sulphite pulp and paper industries.

We claim:

1. A circuit making and/or breaking device for the control of the specific gravity and level of a conducting liquid in a container, comprising a hydrometer and electrodic means, said hydrometer comprising a vessel containing a non-conductive indicating liquid, the latter being immiscible with the liquid to be controlled, said vessel being provided with an opening in its lower part and so located as to permit the two liquids to make contact with each other, the upper part of said vessel communicating with the open air and having a cross-sectional area at the upper level of the indicating liquid which is larger than that at the lower level of said liquid, whereby relatively large vertical movements of the said lower level are obtained, said electrodic means cooperating with the said liquids to make and break a circuit in accordance with vertical movements of the level of contact of the two liquids.

2. In an indicating system for the control of the specific gravity of a liquid, a vessel containing an indicating liquid, the same being substantially nonconductive for electricity and immiscible with the liquid under control, said vessel being provided with an opening in its lower part, whereby the said indicating liquid contacts said liquid under control, and electrodic means operatively associated with said vessel and cooperating with said liquids to make and break a circuit in accordance with changes of the level of contact of the said two liquids, and in which said vessel containing the indicating liquid floats in the said controlled liquid.

3. In an indicating system for the control of the specific gravity of a liquid, a vessel containing an indicating liquid, the same being substantially nonconductive for electricity and immiscible with the liquid under control, said vessel being provided with an opening in its lower part, whereby the said indicating liquid contacts said liquid under control, and electrodic means operatively associated with said vessel and cooperating with said liquids to make and break a circuit in accordance with changes of the level of contact of the said two liquids, and in which said vessel containing the indicating liquid is provided with a float, said vessel normally floating on the upper surface of the controlled liquid by means of the said float, and means forming a stop for said vessel to prevent the same from sinking below a certain level upon the lowering of said upper level of the controlled liquid.

4. The combination of a hydrometer and an electrode adapted for use as an indicator in an electrolyte, in which the hydrometer comprises a vessel floatingly arranged with respect to the electrolyte, said vessel containing a non-conductive indicating liquid, the latter being immiscible with the electrolyte, the said vessel communicating at its upper part with the open air and being provided with an opening in its lower part, whereby the said indicating liquid contacts the electrolyte, said electrode being disposed in the interior of said vessel and adapted to changeably make contact with the electrolyte and be insulated therefrom, whereby the said electrode is changeably subjected to contact with the non-conductive liquid and said conducting liquid depending upon the rise and fall of the level of contact of the said liquids.

5. The combination of a hydrometer and an electrode adapted for use as an indicator in an electrolyte, in which the hydrometer comprises a vessel provided with a float, the top of said vessel being normally supported above the surface of the electrolyte by means of said float, means forming a stop for said vessel to prevent the same from sinking below a certain level upon lowering of the upper level of the electrolyte, said vessel containing a non-conductive indicating liquid, the latter being immiscible with the electrolyte, the said vessel communicating at its upper part with the open air and being provided with an opening in its lower part, whereby the said indicating liquid contacts the electrolyte, said electrode being disposed in the interior of said vessel and adapted to changeably make contact with the electrolyte and be insulated therefrom, whereby the said electrode is changeably subjected to contact with the non-conductive liquid and said conducting liquid depending upon the rise and fall of the level of contact of the said liquids.

ERNST MARTIN THIELERS.
STEN DANIEL VIGREN.
SVEN HARALD KÄFSTEN.